(12) United States Patent
Asakura

(10) Patent No.: US 7,106,549 B2
(45) Date of Patent: Sep. 12, 2006

(54) MAGNETIC RECORDING AND REPRODUCING APPARATUS AND MAGNETIC RECORDING MEDIUM

(75) Inventor: Makoto Asakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 271 days.

(21) Appl. No.: 10/330,095

(22) Filed: Dec. 30, 2002

(65) Prior Publication Data

US 2003/0151846 A1 Aug. 14, 2003

(30) Foreign Application Priority Data

Dec. 28, 2001 (JP) ............. 2001-401967

(51) Int. Cl.
*G11B 5/596* (2006.01)
(52) U.S. Cl. ................................. 360/77.06
(58) Field of Classification Search ............ 360/77.06, 360/77.11, 77.12, 67, 48, 97.01, 316, 318
See application file for complete search history.

(56) References Cited

U.S. PATENT DOCUMENTS

| | | | | |
|---|---|---|---|---|
| 3,263,031 A | * | 7/1966 | Welsh | 360/77.11 |
| 3,404,392 A | * | 10/1968 | Sordello | 360/77.11 |
| 3,956,769 A | * | 5/1976 | Beecroft et al. | 360/77.11 |
| 4,313,140 A | * | 1/1982 | Keidl | 360/77.01 |
| 4,517,612 A | * | 5/1985 | Rijckaert et al. | 360/67 |
| 4,551,777 A | * | 11/1985 | Saito et al. | 360/77.11 |
| 4,556,920 A | * | 12/1985 | Maeda et al. | 360/77.06 |
| 4,633,344 A | * | 12/1986 | Jeffers | 360/77.12 |
| 4,701,815 A | * | 10/1987 | Yada et al. | 360/77.06 |
| 4,935,278 A | * | 6/1990 | Krounbi et al. | 428/65.5 |
| 4,953,161 A | * | 8/1990 | Toyama | 360/77.12 |
| 5,115,364 A | * | 5/1992 | Somers | 360/316 |
| 5,223,994 A | * | 6/1993 | Behr et al. | 360/77.12 |
| 5,311,380 A | * | 5/1994 | Murata et al. | 360/77.12 |
| 5,325,244 A | * | 6/1994 | Takano et al. | 360/77.03 |
| 5,568,331 A | * | 10/1996 | Akagi et al. | 360/77.07 |
| 5,949,604 A | * | 9/1999 | Saliba | 360/76 |
| 6,028,731 A | * | 2/2000 | Bond | 360/77.11 |
| 6,134,072 A | * | 10/2000 | Zweighaft | 360/77.13 |
| 6,157,510 A | * | 12/2000 | Schreck et al. | 360/77.06 |
| 6,614,608 B1 | * | 9/2003 | Belser et al. | 360/48 |
| 2002/0131199 A1 | * | 9/2002 | Takeo | 360/97.01 |

FOREIGN PATENT DOCUMENTS

| | | | |
|---|---|---|---|
| GB | 1443248 | * | 8/1976 |
| JP | 4-89656 | | 3/1992 |
| JP | 10-149524 | | 6/1998 |
| JP | 2001-143218 | | 5/2001 |
| WO | WO 00/28540 | | 5/2000 |

* cited by examiner

*Primary Examiner*—K. Wong
(74) *Attorney, Agent, or Firm*—Oblon, Spivak, McClelland, Maier & Neustadt, P.C.

(57) ABSTRACT

A magnetic recording and reproducing apparatus extracts a record signal from a sum signal (ADD) of signals detected via first and second magnetic detection regions (RH1, RH2) that are formed to be offset in the lengthwise ($T_L$) and widthwise ($T_W$) directions of a recording track having an overlapping part in the widthwise direction ($T_W$), and extracts servo information from a sub signal (SUB).

12 Claims, 10 Drawing Sheets

MAGNETIC RECORDING AND REPRODUCING APPARATUS AND MAGNETIC RECORDING MEDIUM

CROSS-REFERENCE TO RELATED APPLICATIONS

This application is based upon and claims the benefit of priority from the prior Japanese Patent Application No. 2001-401967, filed on Dec. 28, 2001; the entire contents of which are incorporated herein by reference.

BACKGROUND OF THE INVENTION

This invention relates to a magnetic recording and reproducing apparatus and a magnetic recording medium. More particularly, the invention relates to a magnetic recording and reproducing apparatus for recording and reproducing signals as magnetic information on and from a disk-shaped magnetic recording medium, and a magnetic recording medium suitable for use in the apparatus.

Recently, hard disks are enhanced in density at the rate of nearly twice a year. Problems involved in this movement are thermal agitation of media, field detecting sensitivity of heads, and positioning accuracy of heads. Among these problems, thermal turbulence of media is considered solvable to a certain extent by replacing the parallel-to-plane magnetization recording system with the vertical magnetization recording system. As for field detecting sensitivity of heads, significant improvement of sensitivity is expected by using new magnetoresistance elements such as TMR (tunneling magnetoresistance effect elements).

As for the head-positioning servo technique, however, no hopeful measures coping with narrowed tracks have been envisioned heretofore. For HDD (hard disk drive) with superdensity higher than 400 Gbpsi (bit per square inch), desired head-positioning accuracy for servo operation is 5 to 10% of the track pitch. For 1 Tbpsi class, however, the desired accuracy is in the order of several nanometers. This level of accuracy is extremely difficult to achieve.

One of major reasons relates to arms natural vibration and sampling period. Nevertheless, in regard to the former, a double piggyback system, active dumping system, etc. are in the process of examination, and some way of solution will be shortly found for the countermeasure to arm natural vibration. Thus the most important issue to be contemplated for enhancing the performance of the servo system is the latter issue, namely, the sampling period.

There are "servo-plane servo system" and "sector servo system", for example, as the servo system of a hard disk. In case of typical HDD not having so many disks, discrete type control called sector servo system is often employed.

FIG. 14 is a conceptual diagram of a part of tracks and header portion formed on a hard disk. A plurality of tracks T for recording data extend substantially in parallel at a track pitch TP, and a header portion H is provided at their forefront portion in each sector.

In the header portion H, signals called "burst signals" for obtaining track error information (position error signals, abbreviated PES) are recorded. This portion for recording the burst signals includes alternately appearing regions H1 and H2, the former having the alternate record of the "0" level and the "1" level and the latter having the record of "0" level only as illustrated.

The regions H1 are positioned offset from each other such that the centerline C of the track T passes the center of the region H1 or one of its perimeters, respectively. This offset positioning of the regions H1 relative to centerlines C of the tracks T enables its use as servo information for the tracks T.

These burst signals in the header portion H are written on the medium before shipment with a device called "servo track writer".

A magnetic detecting region RH detects these burst signals when running through the header portion. These burst signals are processed, and a tracking error PES is extracted. That is, PES can be obtained only at the moment immediately after the magnetic detecting region RH passes the header portion H where the burst signals are formed.

When the medium disk has N sectors and the disk rotational speed is f (Hz), the servo information is controlled with the sampling period Nf (Hz). In servo control, however, the sampling period of the servo information is a constraint that restricts the servo bandwidth, and the servo bandwidth cannot be higher than approximately ⅛ of the sampling period empirically. This means that the sampling period must be increased to enhance the servo performance such as the response characteristic. Actually, there is also the constraint from arm natural vibration in addition to the constraint from the sampling period. Herein, however, it is targeted to improve the servo performance by increasing the sampling period.

Representative methods for increasing the sampling period include a method of increasing sectors formed on the medium disk and a method of increasing the rotational speed of the medium disk.

The later method, however, may invite an increase of "swinging rotation" with the increase of the rotational speed. When the disk "roughs" under high-speed rotation, disturbance itself to be depressed increases even if the disturbance-depressing rate is increased by expansion of the servo bandwidth. Therefore, residual deviation of the tracking error does not decrease but may rather grow.

On the other hand, increasing the sectors is certainly an effective method in terms of the servo performance. However, it increases the ratio of the servo area surface relative to the disk surface, i.e. the area rate of the header portion. Actually, the rate of occupation by the servo area surface is determined at the trade-off between the ratio of the servo area surface and the servo performance, but it is undesirable that the servo area surface increases to and beyond 10%. In this case, the ratio of the disk surface occupied by the header portion is too large, and the data region decreases. This problem is serious in case of the 1-Tbpsi class surface recording density, and there is the demand for a method capable of increasing the sampling period without increasing sectors.

There are some proposals directed to such requirement. For example, Japanese Patent Laid-Open Publication No. H06-215322 discloses a continuous servo system using two reproducing elements located in alignment along the width direction of a track T to detect a record signal from their sum signal and detect a tracking error signal from their difference signal.

There is also a proposal using a single reproducing head while using a special disk configured to record servo signals on the sidewall of its data region, separate reproduced signals by frequency and thereby separately acquire track error signals and record signals as disclosed in Japanese Patent Laid-Open Publication No. 2000-195200.

Any of these techniques, however, invites deterioration of S/N of reproduced signals when it is applied to HDD. A prospect of improving the sensitivity of the head upon detecting a magnetic field lies in taking measures for continuous servo with the current accessibility as a prerequisite. If the S/N ratio of the disk record signal degrades, circumstances basically change. Decreasing the leak magnetic field from the disk recording magnetic field to the reproducing head or increasing the noise magnetic field from any adjacent track, etc. makes it impossible to keep sufficient S/N of reproduced signals.

In case of the method disclosed in Japanese Patent Laid-Open Publication No. H06-215322, if those two aligned reproducing elements are brought into access to the disk, an electrode between these reproducing elements comes to a central portion of the magnetic domain of the signal recorded on the track, that is, on the center line of the track, and it therefore decreases the intensity of the leak magnetic field from the disk record to the reproducing element portion. In other words, it results in locating the electrode between the pair of reproducing elements in the central portion where the magnetic field profile of the signal recorded on the track is highest, and the read loss is large.

In case of Japanese Patent Laid-Open Publication No. 2000-195200, there is room for improvement in terms of the sensitivity on the part of the servo signals. More specifically, in case no errors are produced, the head falls in a condition no error signal is produced. Therefore, there is substantially no detection sensitivity of servo information near zero error. As a result, the servo rigidity may relatively decreases. Its reason lies in that the error information contained in the detection signal itself is very small in comparison with the signal information and S/N of the extracted error signal is bad accordingly. Thus it is difficult to increase the servo rigidity. Additionally, also in the record/reproduce signal, since the servo signals from opposite sides of the recording track contain harmonic components, even after bandwidth separation, the harmonic components affect the record signal. If there are errors, they may decrease S/N of the reproduced signal.

As explained above, for realizing superdense HDD, conventional techniques require continuous servo capable of simultaneously detecting error signals and reproduced signals with sufficient sensitivity over a sufficient bandwidth, but deterioration of S/N ratio of the reproducing head and other problems make it difficult to realize superdense HDD.

SUMMARY OF THE INVENTION

According to an embodiment of the invention, there is provided a magnetic recording and reproducing apparatus to reproduce information magnetically recorded on a recording track formed in a magnetic recording medium, comprising:

a magnetic head including a first magnetic detection region and a second magnetic detection region which are offset in a lengthwise and widthwise directions of the recording track and have an overlapping part in the widthwise direction;

a record signal extracting portion to extract the information recorded on the recording track on a basis of a sum of signals detected in the first and second magnetic detection regions, respectively;

an error signal extracting portion to extract an error signal of the magnetic head relative to the recording track on a basis of a difference between the signals detected in the first and second magnetic detection regions, respectively; and a servomechanism to correct positional relation between the recording track and the magnetic head on a basis of the error signal.

According to another embodiment of the invention, there is provided a magnetic recording and reproducing apparatus comprising:

a magnetic recording medium having a recording track and guard bands provided on opposite sides of the recording track, the guard bands having an uniform magnetization direction;

a magnetic head including a first magnetic detection region and a second magnetic detection region which are offset in a widthwise directions of the recording track;

a record signal extracting portion to extract the information recorded on the recording track on a basis of a sum of signals detected in the first and second magnetic detection regions, respectively;

an error signal extracting portion to extract an error signal of the magnetic head relative to the recording track on a basis of a difference between the signals detected in the first and second magnetic detection regions, respectively; and a servomechanism to correct positional relation between the recording track and the magnetic head on a basis of the error signal.

According to yet another embodiment of the invention, there is provided a magnetic recording medium comprising:

a recording track made of a first material having relatively low magnetically anisotropic energy; and guard bands made of a second material having relatively high magnetically anisotropic energy on opposite sides of the recording track, each guard band having an alternate arrangement of first and second regions different in direction of magnetization.

According to some embodiment of the invention, since two reproducing heads are offset in both the lengthwise direction and width direction of the track, their sum signal can be detected as a record signal, and their difference signal can be detected as track servo information with high sensitivity. This enables continuous servo ensuring sufficient S/N of reproduced signals and capable of realizing sufficient positioning accuracy of the head, even with HDD having superhigh recording density of at least 1 Tbpsi.

Additionally, according to some embodiments of the invention, by making guard bands which are positioned in opposite sides of the rewritable recording track and prohibit rewriting, it is possible to remove ambiguous magnetic domain regions otherwise produced near an end portion of the recording head and to realize reliable recording and reproduction.

Furthermore, according to some embodiments of the invention, by providing the guard bands with magnetic patterns for servo control, higher bandwidth, reliable servo information can be obtained, and reliable servo control is possible even in superdense recording.

According to yet another embodiment of the invention, there is provided an apparatus for reproducing information recorded on a recording track formed in a magnetic recording medium, comprising:

a magnetic head including a first detection region for detecting a first signal and a second detection region for detecting a second signal, both regions being offset in a first direction and a second direction of the recording track and being partly overlapped in the second direction;

a reproducing unit configured to reproduce the information recorded on the recording track by summing the first and second signals; and a servo control unit configured to generate an error signal for the magnetic head relative to the recording track by obtaining a difference between the first and second signals and configured to control to correct the positional relation between the recording track and the magnetic head based on the error signal.

As a result, those and other embodiments can realize magnetic recording and reproduction remarkably enhanced in recording density.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings:

FIGS. 4A and 4B are graph diagrams exemplifying waveforms of reproduced signals detected by magnetic detection regions RH1 and RH2, in which FIG. 4A shows waveforms not having substantial errors, and FIG. 4B shows waveforms having large errors;

FIGS. 6A and 6B are graph diagrams exemplifying signal outputs obtained by the reproduced signal processing circuit of FIG. 3, in which FIG. 6A shows an extracted recording signal SIG and FIG. 6B shows a track error signal PES;

DETAILED DESCRIPTION

Preferred embodiment of the invention will now be explained below in detail with reference to some specific examples.

(First Embodiment)

As the first embodiment of the invention, explanation is first made on a magnetic recording and reproducing apparatus and a 1 Tbpsi class HDD system using a magnetic recording medium suitable for the magnetic recording and reproducing apparatus.

Figure 1:
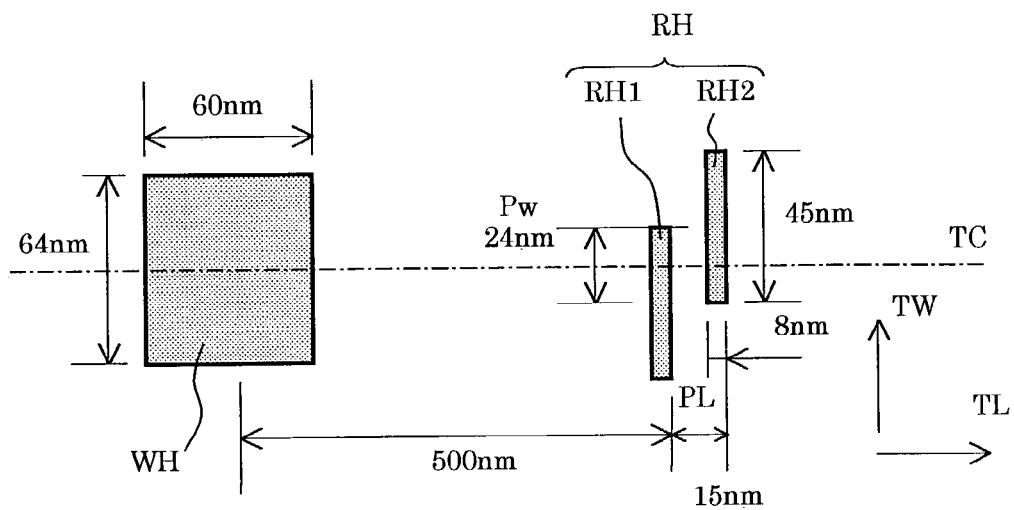
FIG. 1 is a conceptual diagram exemplifying a basic plane configuration of a magnetic head used in a magnetic recording and reproducing apparatus according to the first embodiment of the invention.

FIG. 1 is a conceptual diagram exemplifying a basic plane configuration of a magnetic head used in a magnetic recording and reproducing apparatus according to the first embodiment of the invention.

This magnetic head includes a write region WH for the recording head and a magnetic detection region RH for the reproducing head, which are aligned along the lengthwise direction of tracks of a recording medium, not shown. A magnetic shield, not shown is adequately provided between the write region WH and the magnetic detection region RH.

The magnetic detection region RH for the reproducing head includes two magnetic detection regions RH1, RH2 that are offset in both lengthwise and widthwise directions of the tracks and partly overlap in the widthwise direction. That is, these magnetic detection regions RH1, RH2 are offset in the lengthwise direction $T_L$ of the tracks by the pitch PL and overlap by $P_W$ in the widthwise direction $T_W$ of the tracks.

These magnetic detection regions RH1, RH2 shown here correspond to windows for reading a leak magnetic field obtained from magnetic information stored in the recording medium. That is, parts of the leak magnetic field from the recording medium entering into the magnetic detection regions RH1, RH2 of FIG. 1 are detected. Actually, the magnetic detection regions RH1, RH2 shown in FIG. 1 may be, for example, magnetic detection end surfaces of magnetoresistance elements exposed on the medium-facing surface of the head, or correspond to end surfaces of a magnetic yoke exposed on the medium-facing surface of the head for detecting a record magnetic field from the medium.

For reproduction, the sum of signals obtained from the pair of magnetic detection regions RH1, RH2 is extracted as a record signal. Since each of the magnetic detection regions RH1, RH2 is formed to include the central line Tc of the track of the recording medium to cover the most intensive portion of the recording magnetic field, the magnetic regions RH1, RH2 can detect respective magnetic fields with a low reading loss.

On the other hand, tracking information can be reliably, easily extracted by taking a difference between signals obtained from the pair of magnetic detection regions RH1, RH2.

That is, according to the invention, by using the pair of magnetic detection regions RH1, RH2 in this special positional relation, both the detection of a record signal and the detection of tracking error information can be accomplished with high sensitivity.

Additionally, the write region WH and the magnetic detection region RH shown in FIG. 1 are formed on, for example a slider no shown, and mounted on a motor-driven arm. If this arm has the long-arm configuration disclosed in Japanese Patent Laid-Open Publication No. hei 05-298615, it can prohibit fluctuation of the skew angle. Therefore, by mounting the slider such that these heads have no offset angles relative to the lengthwise direction $T_L$ of the tracks, the positional relation upon accessing to the recording medium can be kept in a favorable range.

In an example in terms of sizes of respective elements, the write region WH may be 64 nm wide and 60 nm long, and the distance between the magnetic detection region RH and the magnetic detection region RH via a shield layer (not shown) may be approximately 500 nm.

Each of the magnetic detection regions RH1, RH2 may be sized 45 nm in the widthwise direction of the tracks and 8 nm in the lengthwise direction of the tracks. These regions RH1, RH2 may be offset in the $T_L$ direction (track traveling direction) by 15 nm and may overlap by approximately 24 nm in the $T_W$ direction (track widthwise direction).

The recording medium used in the magnetic recording and reproducing apparatus according to the embodiment of the invention may have the track pitch of 67.5 nm, and minimum bit length of approximately 9.5 nm. These pitches correspond to 375 kTPI×2667 kBBPI.

Figure 2:
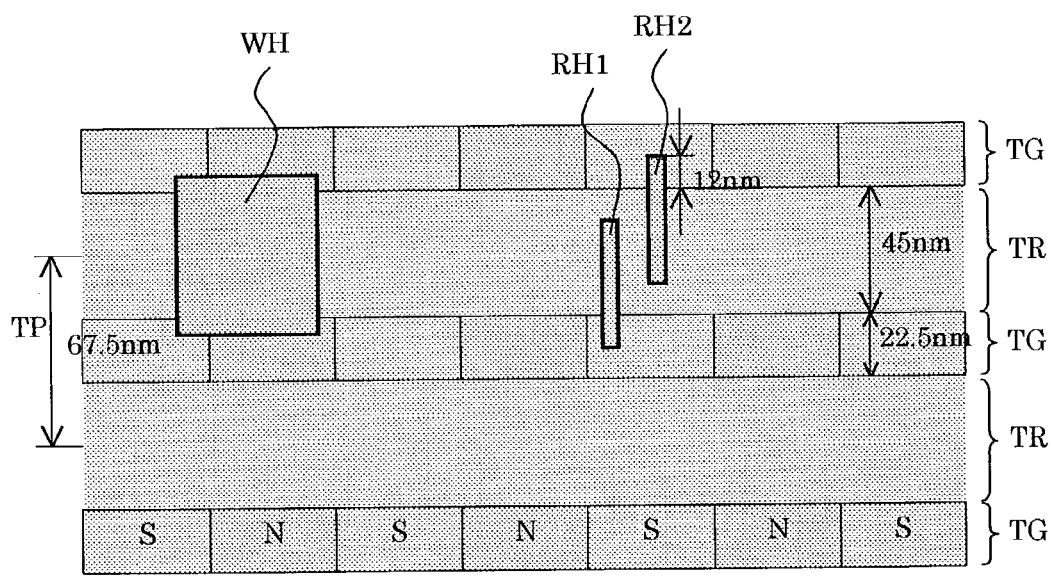
FIG. 2 is a conceptual diagram illustrating a plane configuration of a magnetic recording medium according to an embodiment of the invention.

FIG. 2 is a conceptual diagram illustrating a plane configuration of a magnetic recording medium favorable for use in this embodiment.

The magnetic recording medium has a structure alternately arranging writing-available recording tracks $T_R$ and writing-prohibited guard bands $T_G$. The recording tracks $T_R$ are made of a material available for recording by the record magnetic field applied from the write region WH. The guard bands $T_G$ are made of a material that disables writing by the signal magnetic field from the write region WH.

More specifically, for example, the recording tracks $T_R$ can be realized by giving relatively low coercive force, and the guard bands $T_G$ can be realized by giving relatively high coercive force. For this purpose, the recording tracks $T_R$ may be made of a material having relatively low magnetically anisotropic energy, and the guard bands $T_G$ may be made of relatively high coercive force.

In one example in terms of sizes, in case the track pitch $T_P$ is 67.5 nm, the recording tracks $T_R$ made of writing-available media may have the width of 45 nm, which corresponds to ⅔ Tp, and its guard bands may be 22.5 nm, which corresponds to ⅓ Tp.

Each guard band $T_G$ may be magnetized to the N pole over its entire surface. Alternatively, for the purpose of facilitating synchronous processing, it is useful to provide "patterned media" in which the N pole and the S pole may invert periodically and adjacent guard bands at opposite sides of a recording track $T_R$ exhibit an identical magnetic pole pattern.

Explanation is continued, taking an example using a disk that have a synchronizing servo pattern including an alternate arrangement of N poles and S poles in the guard bands $T_G$. Instead, however, as explained later in conjunction with the third embodiment, N poles and S poles may be formed uniformly in the guard bands $T_G$.

FIG. 2 shows a state in which the head accesses to the recording medium. This state, however, is an ideal state with absolutely no skew angle. Assuming the foregoing example of sizes, the state where each magnetic detection region RH1, RH2 overlaps the guard band $T_G$ over the width of approximately 12 nm is the just-on track state, and also the write region WH fully rides on the track. The track error detection range in which influences of cross talk by the leak magnetic field from the adjacent recording track $T_R$ can be disregarded is 12 nm one way of the other. This value amply covers the plus/minus 3 nm that is the desired positioning accuracy.

Even when the aforementioned long arm configuration, fluctuations in skew angle not larger than one degree is actually produced. In case the distance between the write region WH and the magnetic detection region RH1 is around 500 nm, when the magnetic detection region RH is driven to the ON track state, then the write region WH is offset by approximately 8.7 nm in maximum value. In case the widthwise size of the recording track WH is 64 nm, when the magnetic detection region RH is driven to the just-ON track state, the write region WH straddle the full extension of the recording track $T_R$ (0.8 nm/18.2 nm). Therefore, the write region WH gives no influences to the shape of the magnetic domain formed on the recording track $T_R$, and can form a magnetic domain having a clear shape without deformation.

Still under the same condition, since the distance between the write region WH and the adjacent recording track $T_W$ is reduced to as small as 4.3 nm, there arises a possibility of cross erasure by the leak magnetic field from the write region WH. This possibility, however, can be removed by using a "comb-shaped vertical head" as the structure of the write region WH such that the intensity of the record magnetic field sharply decreases around the head.

Alternatively, for the purpose of increasing the margin, it is also acceptable to employ a method of changing the target offset for servo control in recording/reproduction as explained later in greater detail.

Figure 3:
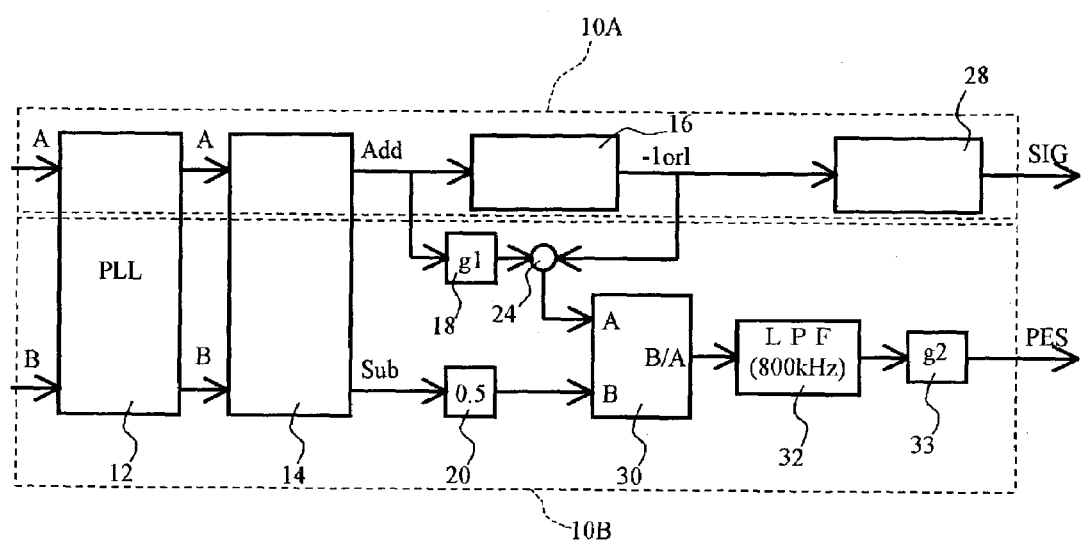
FIG. 3 is a block diagram illustrating a reproduced signal processing circuit in the magnetic recording and reproducing apparatus according to the first embodiment.

Next explained is a method of extracting a record signal SIG and a track error signal PES with reference to FIG. 3.

FIG. 3 is a block diagram illustrating a reproduced signal processing circuit in the magnetic recording and reproducing apparatus according to the instant embodiment.

The reproduced signal processing circuit 10 in this embodiment includes a record signal extracting portion 10A and an error signal extracting portion 10B. The record signal extracting portion 10A extracts a record signal recorded on the recording track based on the sum of reproduced signals A and B obtained from the magnetic detection regions RH1, RH2. The error signal extracting portion 10B extracts the error signal of the magnetic head relative to the track based on the difference between those reproduced signals A and B.

The recording signal extracting portion 10A and the error signal extracting portion 10B will be explained below.

In the instant embodiment, since the magnetic detection regions RH1, RH2 are offset from each other in the track traveling direction, reproduced signals A, B detected by the magnetic detection regions RH1, RH2 contain "phase errors". The circuit having the role of compensating the phase errors is the phase locked circuit 12. For the same purpose, it is also acceptable usually to obtain the nominal value of the signal delay beforehand in a calibration region, not shown, as explained later in greater detail, then correct the delay by real time correction in the phase locked circuit 12, and delay the reproduced signal B into phase synchronism with the reproduced signal A.

In the instant embodiment, however, synchronization processing can be carried out by using servo pattern information obtained from the guard ban TG of the magnetic recording medium. More specifically, the phase-locked circuit 12 may be a circuit using the information on the difference signal SUN. The addition/subtraction circuit 14 is configured to carry out arithmetic operation of the sum signal and the difference signal of the reproduced signals B and A that are synchronized in timing. The sub signal ADD is processed to a detection signal improved in S/N ratio from the reproduced signal A and delivered to a signal processing circuit system.

In the sum signal ADD, influences of the servo pattern formed on the guard band $T_G$ appear. However, since the influences of the magnetic field from the guard band $T_G$ is smaller than the influences of the recording track $T_R$, the reproduced signals can be returned to codes 1 and 0 in a 0/1 coder 28 after passing them through a simple comparator such as a positive/negative determinator, and the output from the 0/1 coder 28 can be taken as the record signal SIG.

On the other hand, the difference signal SUB is obtained in form of a mixture of the servo pattern and the record signal in which the size of an error corresponds to the amplitude.

For extracting only this amplitude of the difference signal, the sum signal is first multiplied by an appropriate gain, and a difference between the sum signal and the output from the negative¥positive determinator to create a modulation reference signal. After that, the difference signal is divided by the modulation reference signal. A signal obtained in this manner through a divider 30 corresponds to the extracted amplitude of the difference signal, although it contains a slight amount of high frequency components. The gain g1 (18) and g2 (33) are appropriate adjusting gains, and they are adjusted to optimum values to maximize the depression ratio of the harmonic components before shipment.

Finally, to remove high-frequency influences, the signal is filtered through a low-pass filter 32 having a sufficiently high shutoff frequency than the servo bandwidth, and the error signal PES is obtained.

Figure 4A:
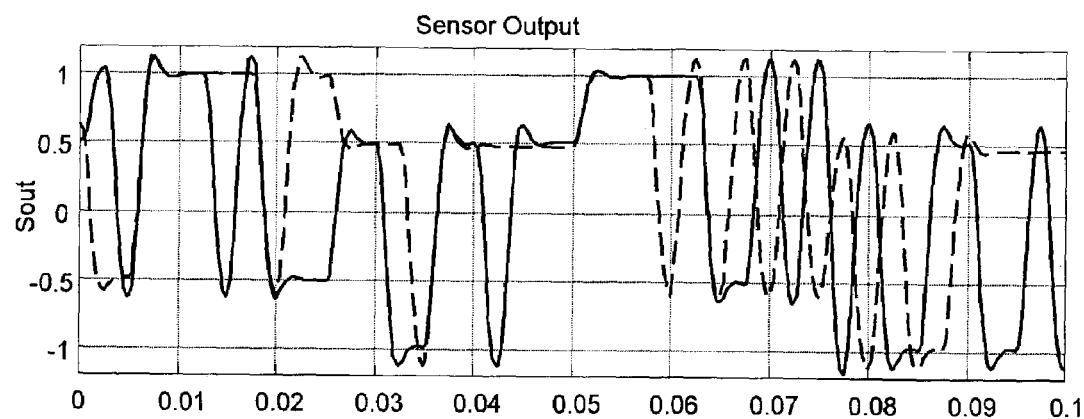
Figure 4B:
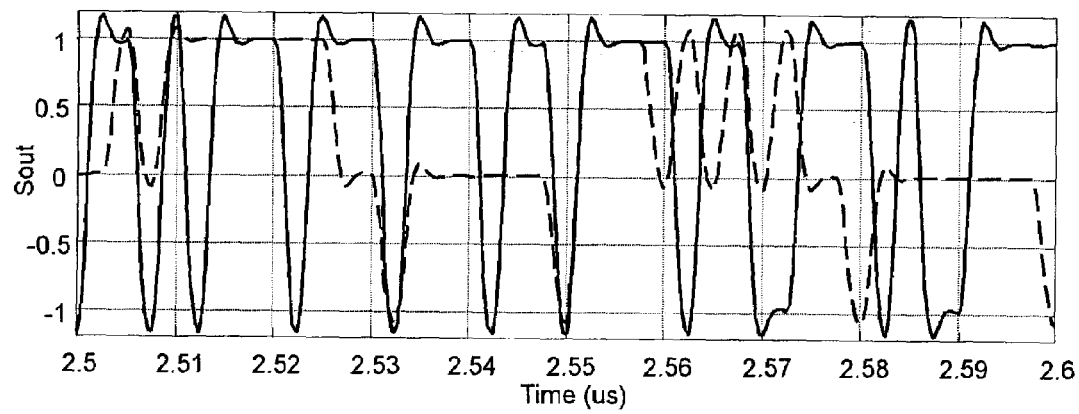

FIGS. 4A and 4B are graph diagrams exemplifying waveforms of reproduced signals detected by magnetic detection regions RH1 and RH2, in which FIG. 4A shows waveforms not having substantial errors, and FIG. 4B shows waveforms having large errors. Solid lines and broken lines respectively show the waveforms of the reproduced signals obtained from the detection regions RH1, RH2, respectively.

When no errors exist, the balance between the record signal obtained from the recording track $T_R$ and the servo pattern signal obtained from the guard band $T_G$ is identical between two magnetic detection regions RH1, RH2. Therefore, as shown in FIG. 4A, the ratio of high-frequency components contained in the reproduced signal is equal between the signal waveform from the magnetic detection region RH1 (solid line) and the signal waveform from RH2 (broken line).

In contrast, when error increases, the balance between the record signal and the servo pattern is no more identical between two magnetic detection regions RH1, RH2. That is, since the ratio of the servo pattern signal becomes higher in one of the heads, high-frequency components increase. Therefore, in case of the specific example shown in FIG. 4B, high-frequency components have increased in the reproduced signal from the magnetic detection region RH2 (broken line).

Figure 5A:
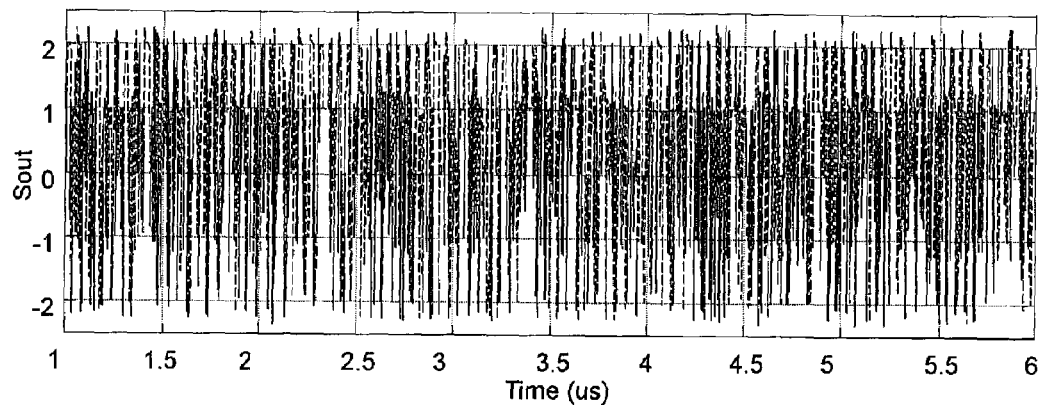
FIGS. 5A and 5B are graph diagrams exemplifying a sum signal ADD and a difference signal SUB obtained by an addition/subtraction circuit 14 of the reproduced signal processing circuit shown in FIG. 3.
Figure 5B:
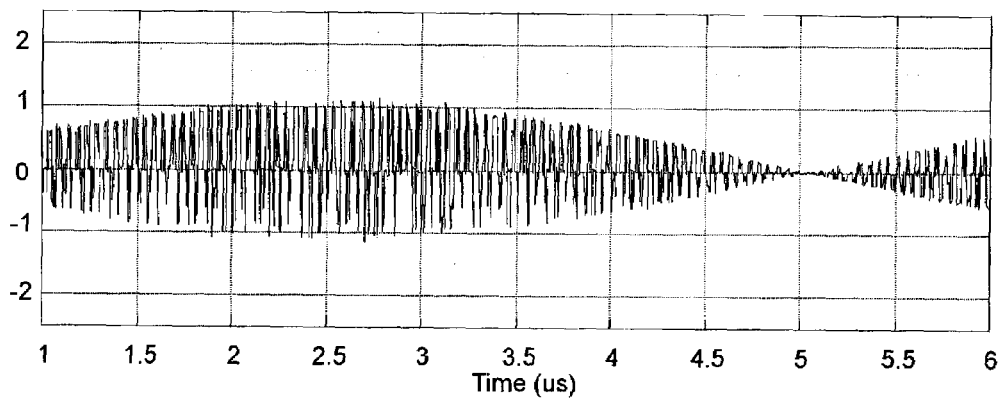

FIGS. 5A and 5B are graph diagrams exemplifying a sum signal ADD and a difference signal SUB obtained by an addition/subtraction circuit 14 of the reproduced signal processing circuit shown in FIG. 3. Here is shown the long-time in the case where the track errors vary in a sinusoidal waveform. It is appreciated that the track error has been detected in the difference signal SUB as its amplitude with high sensitivity.

Figure 6A:
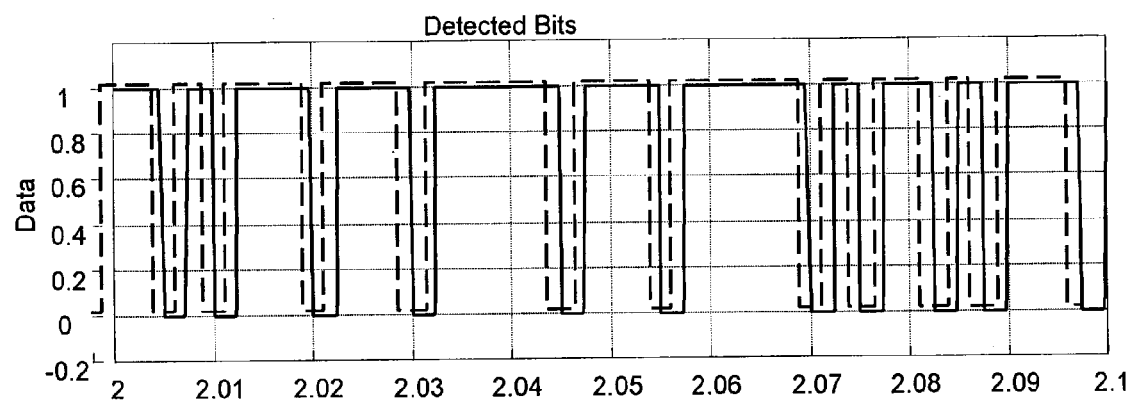
Figure 6B:
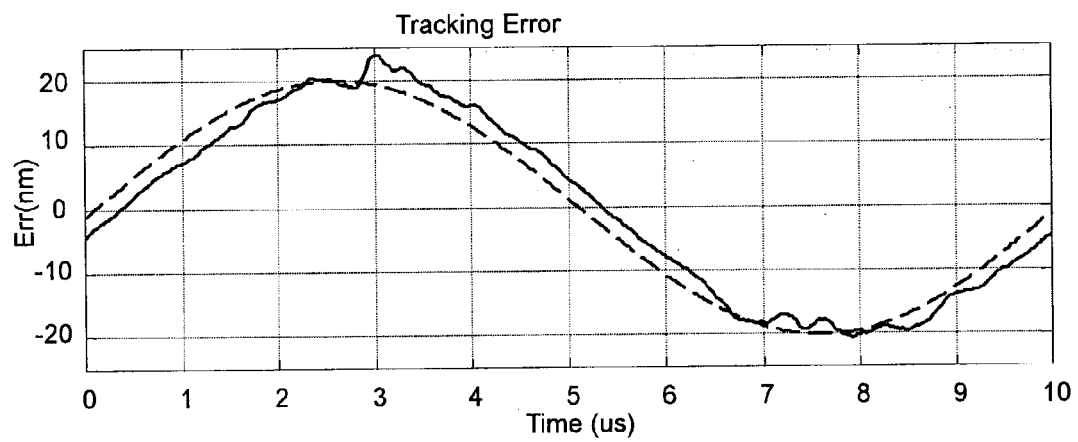

FIGS. 6A and 6B are graph diagrams exemplifying signal outputs obtained by the reproduced signal processing circuit of FIG. 3, in which FIG. 6A shows an extracted recording signal SIG and FIG. 6B shows a track error signal PES. In these graphs, signals are shown by solid lines, and true values, i.e. actual values, are shown by broken lines.

When deviation increase, errors slightly increase even in the record signal SIG due to a tendency of incomplete removal of harmonic components. Generally, however, it is appreciated that the record signal SIG and the error signal PES exhibit values very near to the true values. Especially when the servo errors are approximately zero, it has been confirmed that the track error signal can be detected with remarkably high S/N and linearity.

In case of using a recording medium having a guard band $T_G$ uniformly magnetized to the N pole, a processing circuit system simpler than that of FIG. 3 can be used.

The servomechanism operative under the error signal PES extracted as explained above is briefly explained below. To reduce the desired positioning accuracy to plus/minus 3 nm, improvement for reducing asynchronous swinging rotation of the fluid bearing spindle, improvement of the low-bandwidth disturbance depressing rate of VCM (voice coil motor) with measures against arm natural vibrations, improvement of the high-bandwidth depressing rate by double piggyback servo, and other equivalent measures are effective. Also in this embodiment, these servo measures may be employed to realize more stable servo.

With the configuration explained above, it is possible to realize continuous servo capable of ensuring sufficient S/N of reproduces signals and sufficient head positioning accuracy even with HDD having superhigh recording density not lower than 1 Tbpsi.

In future activities for enhancing the density, the head will be downsized beyond a reasonable degree for its manufacture as far as the techniques are improved within the conventional logic. However, by using this or another embodiment of the invention, the head size (the size in the widthwise direction of the track) is permitted to increase, and this is advantageous not only for better detection sensitivity but also for the manufacture of the head.

Along with progressive superdensity, the increase of servo writing time caused by the increase of tracks becomes a problem from the viewpoint of productivity. However, this or other embodiment of the invention omits servo writing by employing the patterned media in the guard band. Therefore, the product can be completed solely by the processing before shipment, namely, recording of information such as sector information, etc. after its assembling to a drive state, and the invention is advantageous also from the viewpoint of the manufacture of the drive.

That is, the instant embodiment of the invention is effective not only for the head sensitivity and the positioning accuracy but also for productivity to manufacture high-density HDD.

(Second Embodiment)

Figure 7:
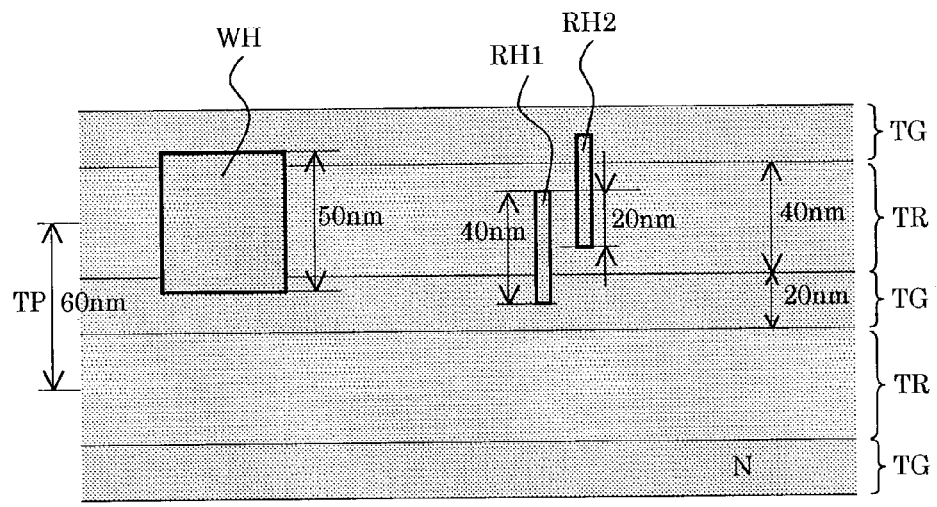
FIG. 7 is a diagram showing a recording medium accessed by the head.
Figure 8:
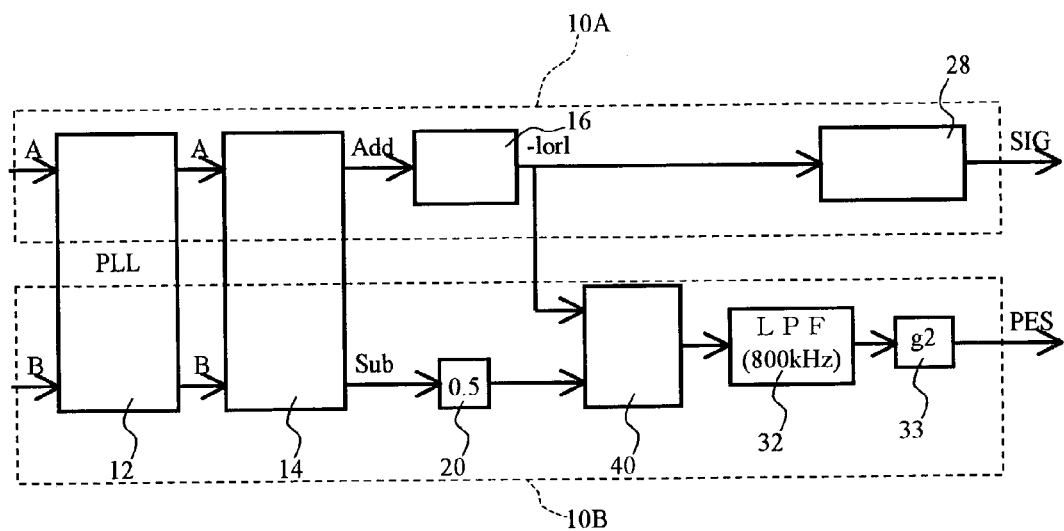
FIG. 8 is a block diagram illustrating a reproduced signal processing circuit in the second embodiment of the invention.

Next explained is the second embodiment of the invention by way of a specific example using the head configuration of the first embodiment and using a different recording medium with reference to FIGS. 7 and 8. The configuration shown here is a specific example using a recording medium in which the guard band $T_G$ is uniformly magnetized to the N pole. This facilitates the manufacture of the recording medium and simplifies the signal processing circuit, etc.

FIG. 7 shows a recording medium accessed by the head. In this specific example, the magnetic recording medium has a structure alternately arranging writing-available recording tracks $T_R$ and writing-prohibited guard bands TG. The recording tracks $T_R$ are made of a material available for recording by the record magnetic field applied from the write region WH. The guard bands $T_G$ are made of a material that disables writing by the signal magnetic field from the write region WH. However, the guard bands $T_G$ in this example are initially formed of uniform N magnetic poles. Although they are symmetric about the intervening recording track TR, their pattern is different from the magnetization pattern shown in FIG. 2 in which N magnetic poles and S magnetic poles are repeated alternately.

The medium having uniformly magnetized guard bands $T_G$ can be obtained by first manufacturing a disk, then applying an intensive, uniform external magnetic field to the entire surface of the disk, and thereafter applying a uniform, opposite magnetic field enough to cause magnetization reversal of the recording tracks $T_R$ alone without inviting magnetization reversal of the guard bands $T_G$. Through this processing, the recording medium including magnetically reversed Guard bands $T_G$ and recording tracks $T_R$ can be initialized easily.

Additionally, in the initial state of this medium, the guard bands $T_G$ and the recording tracks $T_R$ are oppositely magnetized. Therefore, after it is assembled as HDD, the sector formatting can be readily carried out in the drive state. This results in enhancing the productivity.

The recording medium need not be one in which the guard bands $T_G$ are made of a magnetic material having a relatively high coercive force as used in the instant embodiment. Known media having nonmagnetic guard bands or media in which surfaces of the guard bands $T_G$ form grooves while surfaces of the recording tracks $T_R$ are convex are also acceptable.

Next explained is a method of reproducing signals with reference to FIG. 8. Since the reproducing head has AC detection (high pass detection) characteristics to prevent influences from low bandwidth noise, guard band influences applied to the reproduced detection signals A, B as DC influences are very small. That is, only magnetization of the overlapping portions of the magnetic detection regions RH1, RH2 on the recording track $T_R$ appears as detection signals A and B.

However, since the magnetic detection regions RH1, RH2 are offset in the track traveling direction, a phase locked circuit compensates the phase error. Although not explained in detail, processing for phase synchronization is carried out by determining the nominal value of the signal delay beforehand in the calibration region not shown, then detecting a phase difference between a delayed signal of the reproduced signal B and the reproduced signal B by internal detection, and correcting the delay of the reproduced signal B by real time correction.

After that, outputs A, B_ of the phase locked circuit 12 are added and subtracted to produce an Add signal and a Sub signal. The Sub signal is equivalent to the result of subtraction of the overlapping amount of the magnetic detection region RH2 on the recording track $T_R$ from the overlapping amount of RH1, it is a signal having the modulation period of the record signal as its oscillation period and having the amplitude twice the tracking error. That is, the track error TE can be presumed by multiplication of the recording modulation under presumption of its sign as (−1 or 1).

Figure 9A:
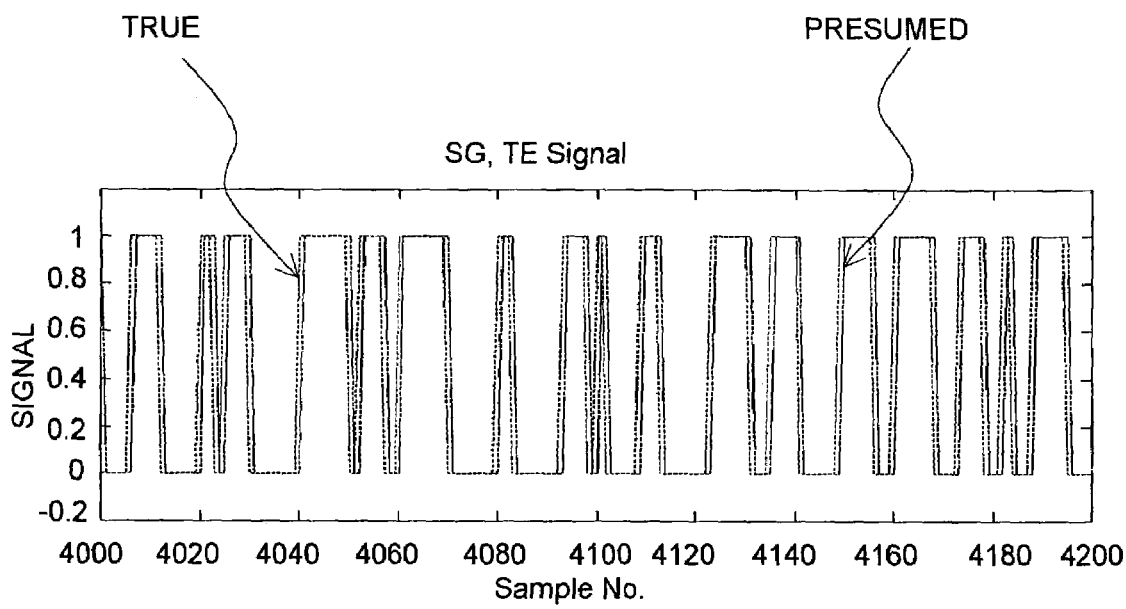
FIG. 9A is a diagram showing a reproduced record signal SG detected by a detector circuit of FIG. 8.
Figure 9B:
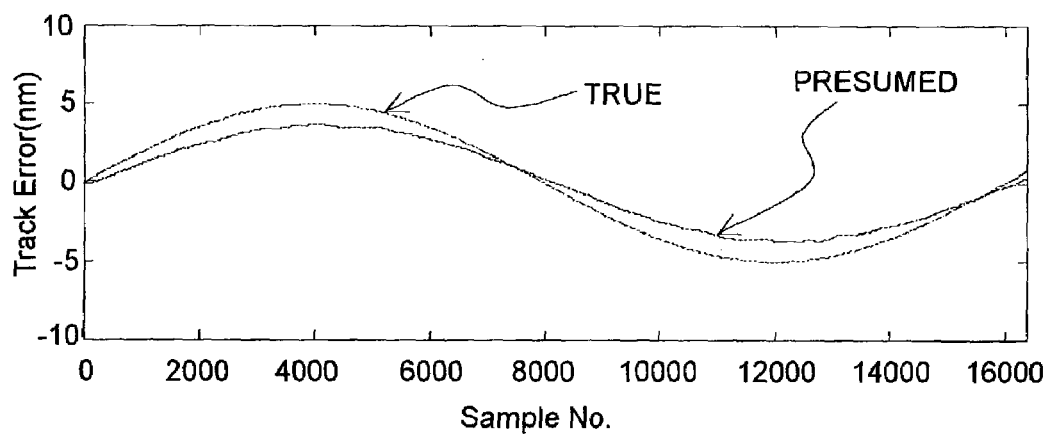
FIG. 9B is a diagram showing a positional error signal PES detected by the detector circuit of FIG. 8.

FIG. 9A shows a reproduced record signal SG detected by a detector circuit of FIG. 8, and FIG. 9B shows a positional error signal PES detected by the detector circuit of FIG. 8. As compared with the actual track error (dotted line), the presumed error (solid line) suffers a slight gain decrease. However, by calibrating the final-stage proportional gain in the calibration region, not shown, coincidence in amplitude with the true value is possible, and sufficient detection accuracy can be maintained.

(Third Embodiment)

Next explained is a 400 Gbpsi-class HDD system combining a vertically magnetized patterned medium according to an embodiment of the invention with double reproducing heads disclosed in Japanese Patent Laid-Open Publication No. hei 06-215322, for example, with reference to FIGS. 10 through 13. The specific example shown here is a system in which the track pitch of the recording medium is 115 nm, and the minimum bit length is 14 nm. Its head accessing mechanism may be of a type using an arm configuration with the same length as the conventional one and varying in skew angle between inner circumferential portions and outer circumferential portions of the medium disk.

Figure 10:
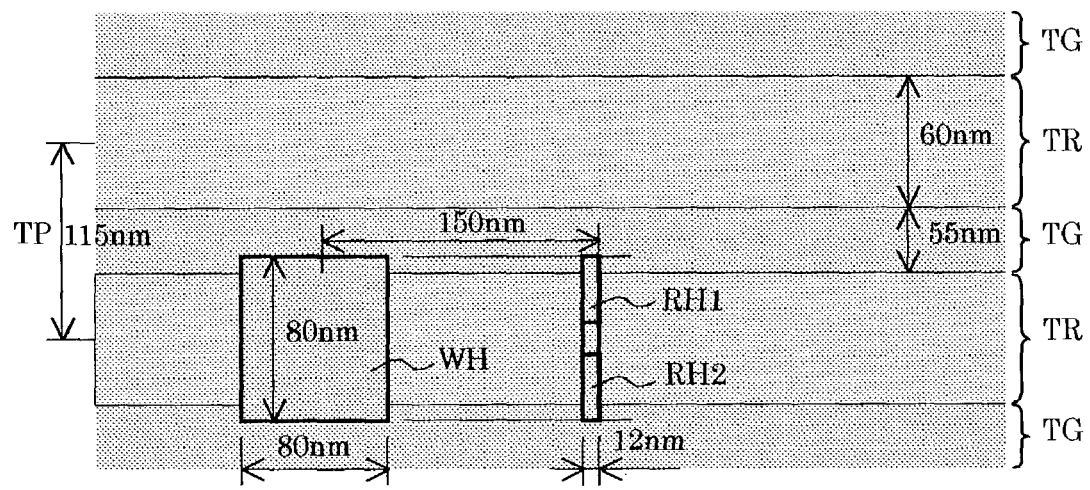
FIG. 10 is a conceptual diagram illustrating the head located on the magnetic recording medium in the third embodiment of the invention.

FIG. 10 is a conceptual diagram illustrating the head located on the magnetic recording medium in the third embodiment of the invention. The magnetic recording medium has a structure alternately arranging 55 nm wide guard bands $T_G$ and 60 nm wide recording tracks $T_R$, and the guard bands $T_G$ are made of a magnetic material having a high coercive force. Therefore, polarity reversal does not occur in the guard bands $T_G$ with the record magnetic field from the write region WH. In the guard bands $T_G$, predetermined magnetization to the N magnetic polarity is held upon disk initialization processing before shipment, and magnetic domains are formed by the record magnetic field from the write region WH solely in the recording tracks $T_R$.

Taking account of changes in posture by the skew angle, 80 nm wide write regions WH wider than the recording tracks $T_R$ are used here. Similarly, width of the reproducing head (width adding the magnetic detection regions RH1, RH2) is also increased in width to 80 nm, which is wider than the recording track $T_W$.

Here is employable a head configuration in which the distance between the magnetic detection region RH and the write region WH is 150 nm, for example, and the insulating wall is thinner. Data regions of the recording tracks $T_R$ are initialized before shipment to magnetize the entirety to the S pole by applying a weak magnetic field near the record magnetic field of the write region WH as the external magnetic field. The formatting for recording sector information, etc. can be carried out by using a servo write technique called "self servo" using those S and N poles.

Figure 11:
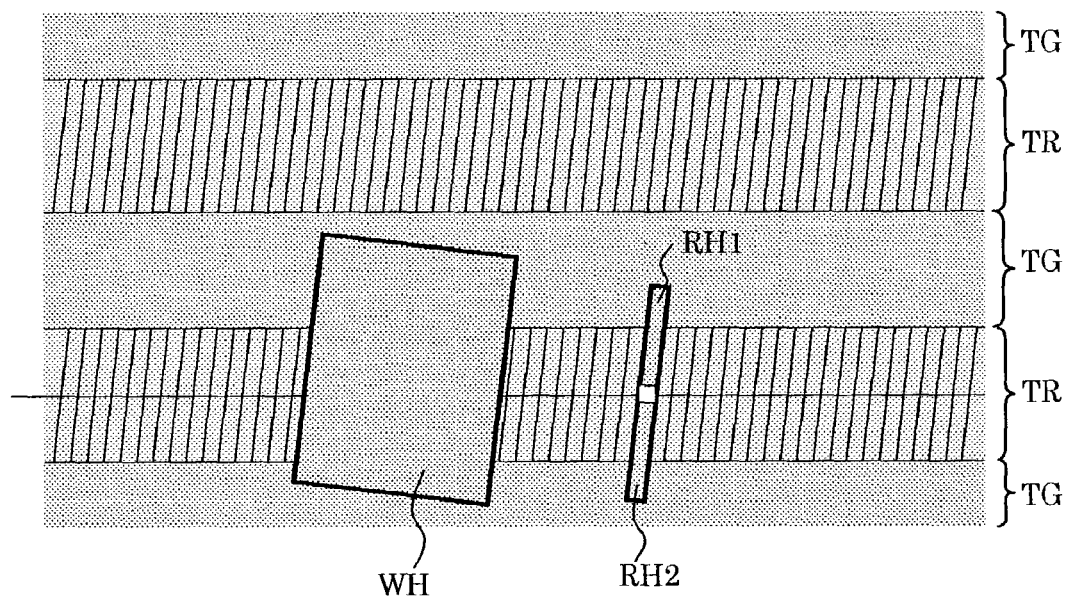
FIG. 11 is a conceptual diagram illustrating the state of a magnetic domain recorded on the magnetic recording medium in the third embodiment of the invention.
Figure 12A:
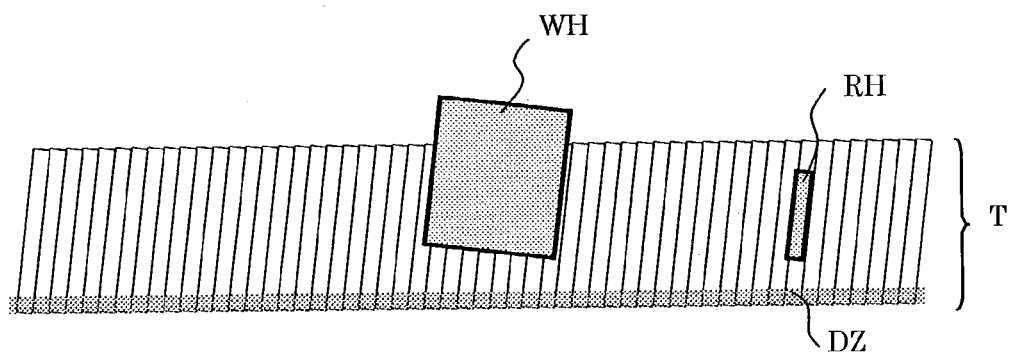
FIGS. 12A and 12B are conceptual diagrams illustrating the states of magnetic domains recorded on conventional uniform magnetic recording mediums with a larger skew angle.
Figure 12B:
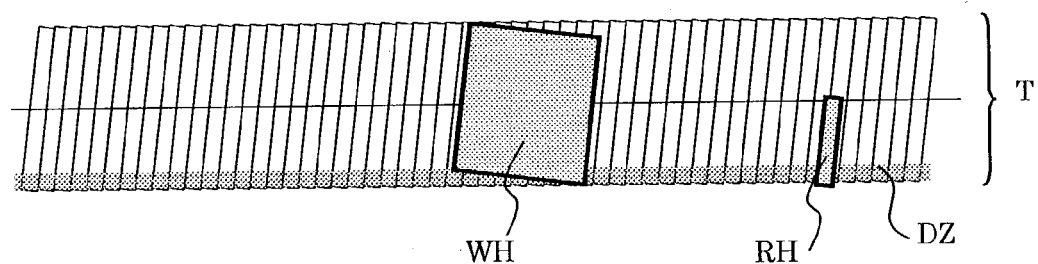

FIG. 11 is a conceptual diagram illustrating the state of a magnetic domain recorded on the magnetic recording medium in the third embodiment of the invention. Here is shown a magnetic domain recorded with a large skew angle. However, for the comparison purpose, first explained is a conventional uniform vertical recording medium with a larger skew angle with reference to FIGS. 12A and 12B.

In case of a uniform, vertically magnetized recording medium not having guard bands $T_G$, like a magnetic recording medium according to an embodiment of the invention, very ambiguous magnetic domains are formed at end portions of the write region WH in the widthwise direction of the tracks. They are formed at end portions of the recording tracks T as labeled with DZ in FIG. 12.

A leak magnetic field from the region DZ having such an ambiguous magnetic domain gets in cross-interference with the magnetic field directly under the magnetic detection region RH, and invites S/N degradation. To reduce influences from the region DZ, there is a method of reducing the width of the magnetic detection region RH than the recording width. This method, however, narrows the detectable range of the reproducing head, degrades the detection sensitivity itself, and invites degradation of S/N by influences of electric noise, etc. In case of the conventional uniform, vertical magnetic recording medium, sizes and positions had to be determined at the trade-off of influences from the ambiguous region DZ and degradation of the detection sensitivity by reduction of the width of the reproducing element. However, as the magnetic domain is downsized in high-density recording, highly sensitive signal detection becomes difficult.

In contrast, according the instant embodiment, since the end portions of the write region WH overlap the guard bands TG prohibiting recording, ambiguous magnetic domains due to the skew angle are not formed. Instead, magnetic domains formed on the recording tracks $T_R$ are recorded very clearly. Additionally, since the guard bands $T_G$ are N magnetic poles, the leak magnetic current profile on the part of the S magnetic pole in the leak magnetic field profile formed on the recording magnetic domain of the recording track $T_R$ is sharper than so-called "discrete pattern media" in which the guard bands $T_G$ are made of a nonmagnetic material and have no poles. Since it is detected by the magnetic detection regions RH1, RH2 covering the full width of the recording track $T_R$, S/N ratio is enhanced.

In case of the reproducing head in this specific example, the central portion of the recording track $T_R$ where the best quality signal can be obtained lies on the "join" of two magnetic detection regions RH1, RH2, and there is a loss by placement of the electrodes, etc., it leads to degradation of S/N. Nevertheless, signals better in S/N than conventional ones can be obtained because of various advantages, such as availability for use of wider reproducing elements than conventional ones and lower-noise magnetic domains.

Figure 13:
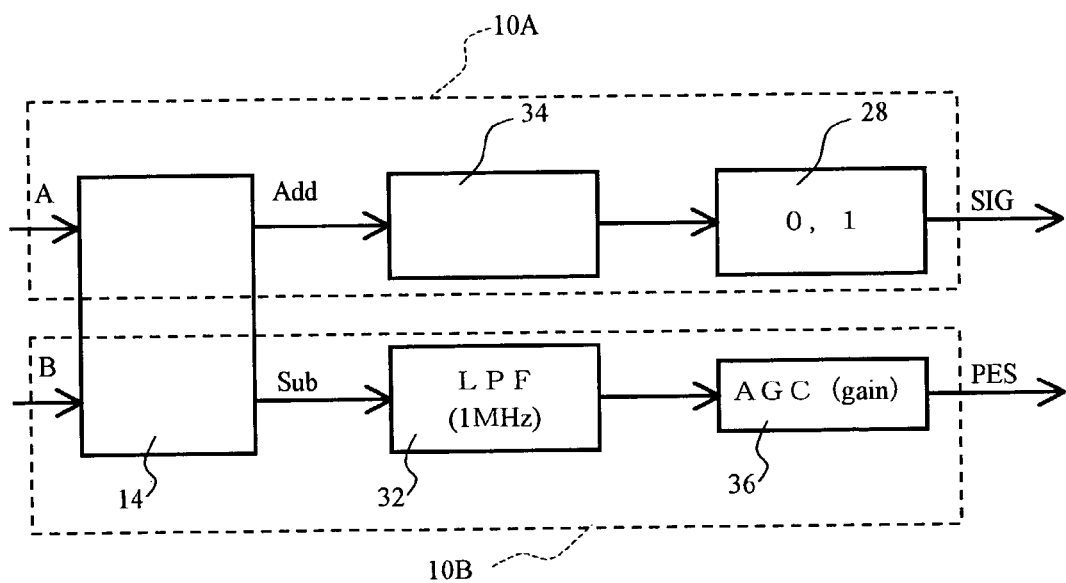
FIG. 13 is a block diagram illustrating a method of acquiring a record signal SIG and a track error signal PES from reproduced signals A and B.
Figure 14:
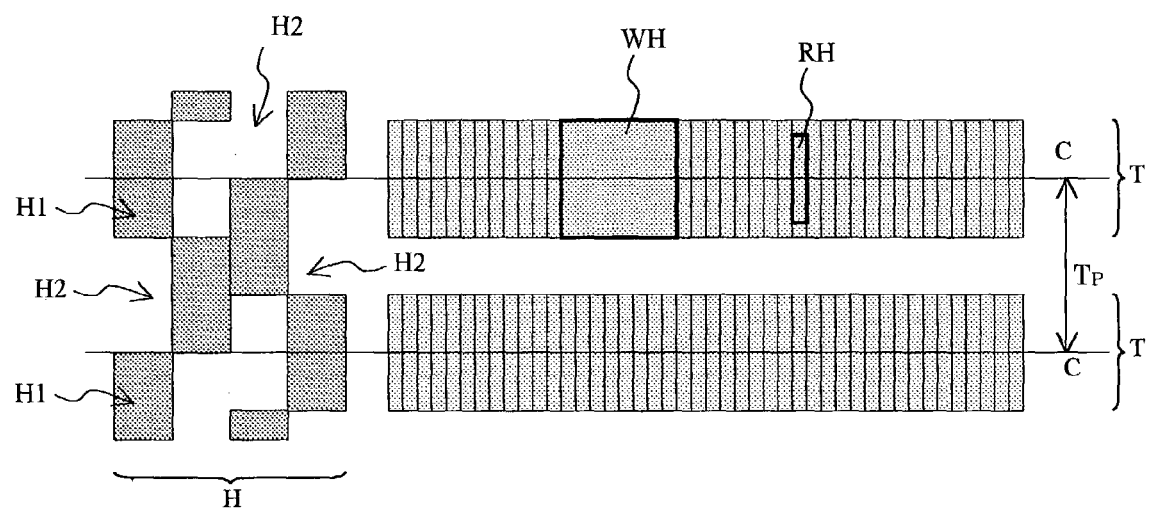
FIG. 14 is a conceptual diagram illustrating a part of tracks and header portion formed on a hard disk.

Next explained is a method of acquiring the record signal SIG and the track error signal PES from the reproduced signals A, B with reference to FIG. 13.

The magnetic head used in this specific example involves some problems in terms of the signal detection sensitivity. However, as already explained, it can be improved in S/N ratio than the conventional single-type reproducing head type when combined with the magnetic recording medium according to an embodiment of the invention.

As taught in Japanese Patent Laid-Open Publication No. hei 06-215322, the record signal SIG is obtained by simple addition of the reproduced signals A and B. In this case, the record signal SIG suffers bias influences of the guard bands. Nevertheless, since the amplitude is larger than that of the conventional single-type reproducing head, the S/N ratio is improved.

On the other hand, the difference signal SUB is zero when the recording magnetic domain is the N magnetic pole, and it becomes a signal corresponding to the track error when the recorded domain is the S magnetic pole. Thus the circuit of FIG. 13 filters the difference signal SUB through a low pass filter 32 and generates the track error signal PES via an automatic gain controller 36.

The record signal is modulated to a signal of a frequency not lower than a certain bandwidth upon encoding in the encoder 28. Therefore, if the low pass processing bandwidth is limited sufficiently smaller than that bandwidth and sufficiently larger than servo bandwidth, then the influences of the record signal do not appear in the track error signal PES, and the phase delay influences to the servo controller can be disregarded.

The same detection is similarly possible even in the processing circuit mentioned in conjunction with the second embodiment.

For reproduction, a servo control system, not shown, carries out servo processing to reduce PES to zero.

During signal recording, if the magnetic detection region RH rides on the track, the write region WH suffers skew angle influences, the it is offset from the recording track $T_R$ due to the distance between the reproducing head and the recording head. In the head in this specific example, since the skew angle varies by plus/minus 12 degrees approximately, skew angle offset around 31 nm occurs. This problem is dealt with by shifting the position of the reproducing head by an amount corresponding to the skew angle offset value by servo control. That is, the control mode is changed to position the recording head at the center of the recording track during recording and to position the reproducing head at the center of the recording track.

Heretofore, some embodiments of the invention have been explained with reference to some specific examples. However, the invention is not limited to those specific examples. For instance, in regard to specific configurations of the electric signal processing system and mechanical system of the magnetic recording and reproducing apparatus, the invention contemplates all changes or modifications appropriately chosen by persons skilled in the art as far as they produce the same or equivalent effects.

Also in regard to specific configurations of the recording head and the reproducing head used in some embodiments of the invention, persons skilled in the art will be able to selectively use various configurations. For example, they will be able to use various configurations of the reproducing head using TMR, spin valve structures and other various kinds of magnetoresistance elements as the magnetic detection elements. Furthermore, a structure directly exposing the magnetic detection elements to the medium-facing surface of the head, or a structure applying a magnetic field to the magnetic detection elements through a magnetic yoke provided on the medium-facing surface, is also acceptable.

Also in regard to the magnetic recording medium according to an embodiment of the invention, the invention contemplates all changes or modifications in size and period of arrangement of the recording tracks and the guard bands, and in material of any component as far as they produce the same or equivalent effects.

Furthermore, the magnetic recording and reproducing apparatus according to the invention and the magnetic recording medium used therein may be either of a "stationary type" including one or more magnetic recording mediums, or of a "removable type" removably including such a magnetic recording medium.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A magnetic recording and reproducing apparatus comprising:
   a magnetic recording medium having a recording track available for recording by a record magnetic field, and guard bands provided on opposite sides of the recording track and being disabled for recording by the record magnetic field;
   a magnetic head including a first magnetic detection region and a second magnetic detection region which are offset in a lengthwise and widthwise directions of the recording track and have an overlapping part in the widthwise direction, and a write region provided in the lengthwise direction from the magnetic detection regions, the write region applying the recording magnetic field to the magnetic recording medium, a region covered by at least one of the first and second magnetic detection regions having a width in the widthwise direction of the recording track, the width being wider than a width of the recording track;

a compensating circuit that compensates phase error of signals detected in the first and second magnetic detection regions corresponding to the offset in the lengthwise direction of the recording track between the first and second magnetic detection regions and outputs as a first and second reproducing signals;

a record signal extracting portion to extract the information recorded on the recording track on a basis of a sum of the first and second reproducing signals;

an error signal extracting portion to extract an error signal of the magnetic head relative to the recording track on a basis of a difference between the first and second reproducing signals; and a servomechanism to correct positional relation between the recording track and the magnetic head on a basis of the error signal.

2. A magnetic recording and reproducing apparatus according to claim 1, wherein each one of the guard bands has an alternate arrangement of first and second regions different in direction of magnetization, and wherein the error signal extracting portion compares high-frequency signal components obtained from the guard bands in signals acquired by the first and second magnetic detection regions.

3. A magnetic recording and reproducing apparatus according to claim 1, wherein the magnetic head includes first and second magnetoresistance elements, and wherein the first and second magnetic detection regions are magnetic detection end surfaces of the first and second magnetoresistance elements.

4. A magnetic recording and reproducing apparatus according to claim 1, wherein the magnetic head includes first and second magnetic yokes for detecting a magnetic field from the magnetic recording medium, and wherein the first and second magnetic detection regions are end surfaces of the first and second magnetic yokes.

5. A magnetic recording and reproducing apparatus according to claim 1, wherein the magnetic head includes a write region to apply a magnetic field to the magnetic recording medium and wherein the first and second magnetic detection regions and the write region extend in the lengthwise direction of the recording track.

6. A magnetic recording and reproducing apparatus according to claim 1, wherein the guard bands have a uniform direction of magnetization, and wherein the error signal extracting portion creates the error signal on a basis of a modulation period of the record signal obtained from the recording track.

7. A magnetic recording and reproducing apparatus comprising:

a magnetic recording medium having a recording track available for recording by a record magnetic field and guard bands provided on opposite sides of the recording track and being disabled for recording by the record magnetic field, the guard bands having an uniform magnetization direction;

a magnetic head including a first magnetic detection region and a second magnetic detection region which are offset in lengthwise and widthwise directions of the recording track and have an overlapping part in the widthwise direction, and a write region provided in the lengthwise direction from the magnetic detection regions, the write region applying the recording magnetic field to the magnetic recording medium, a region covered by at least one of the first and second magnetic detection regions having a width in the widthwise direction of the recording track, the width being wider than a width of the recording track;

a compensating circuit that compensates phase error of signals detected in the first and second magnetic detection regions corresponding to the offset in the lengthwise direction of the recording track between the first and second magnetic detection regions and outputs as a first and second reproducing signals;

a record signal extracting portion to extract the information recorded on the recording track on a basis of a sum of the first and second reproducing signals;

an error signal extracting portion to extract an error signal of the magnetic head relative to the recording track on a basis of a difference between the first and second reproducing signals; and a servomechanism to correct positional relation between the recording track and the magnetic head on a basis of the error signal.

8. A magnetic recording and reproducing apparatus according to claim 7, wherein the recording track is made of a first material having relatively low magnetically anisotropic energy, and the guard bands are made of a second material having relatively high magnetically anisotropic energy.

9. A magnetic recording and reproducing apparatus according to claim 7, wherein the error signal extracting portion creates the error signal on a basis of a modulation period of the record signal obtained from the recording track.

10. A magnetic recording and reproducing apparatus according to claim 7, wherein the magnetic head includes first and second magnetoresistance elements, and wherein the first and second magnetic detection regions are magnetic detection end surfaces of the first and second magnetoresistance elements.

11. A magnetic recording and reproducing apparatus according to claim 7, wherein the magnetic head includes first and second magnetic yokes for detecting a magnetic field from the magnetic recording medium, and wherein the first and second magnetic detection regions are end surfaces of the first and second magnetic yokes.

12. A magnetic recording and reproducing apparatus according to claim 7, wherein the magnetic head includes a write region to apply a magnetic field to the magnetic recording medium and wherein the first and second magnetic detection regions and the write region extend in the lengthwise direction of the recording track.

* * * * *